Patented May 29, 1945

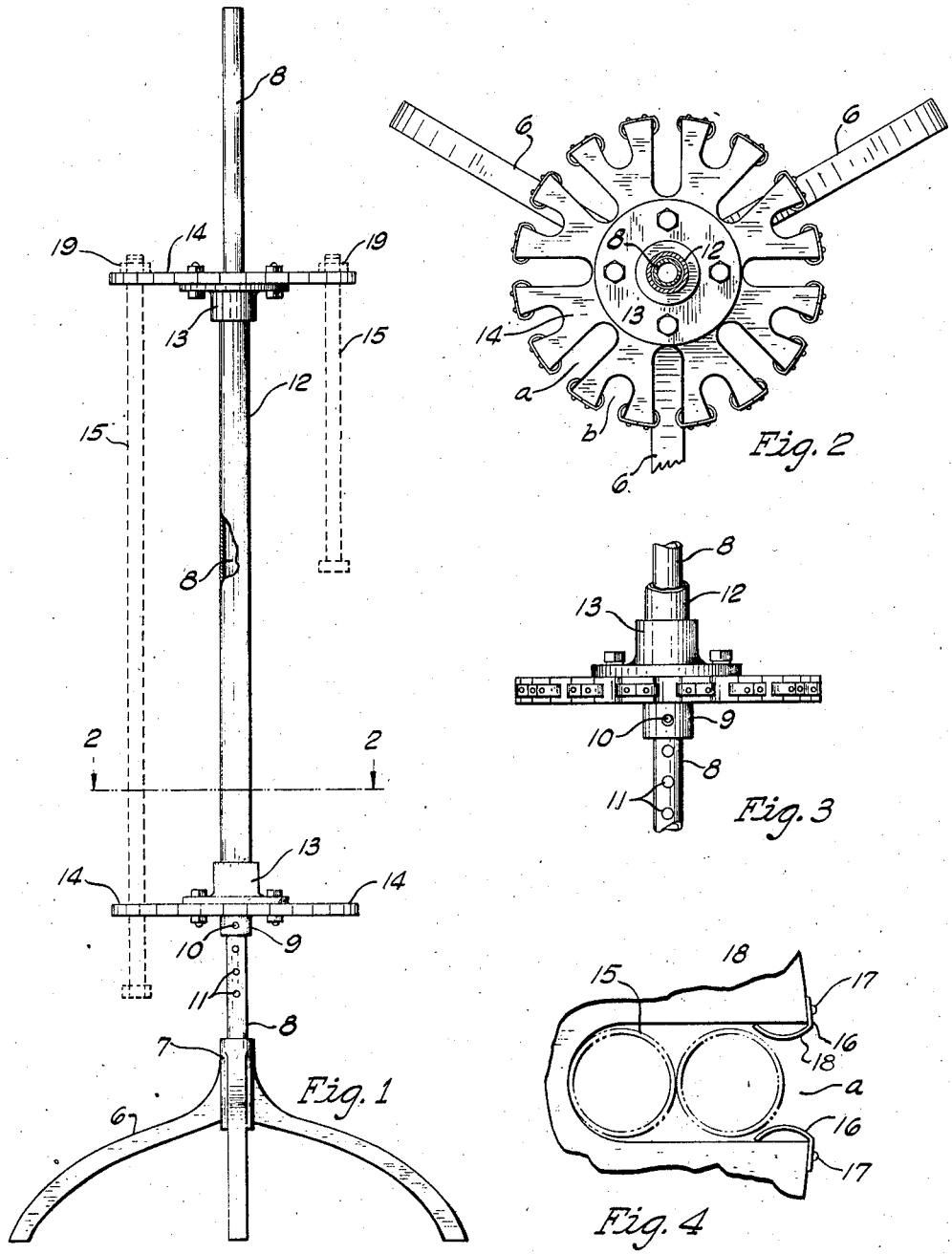

2,376,955

UNITED STATES PATENT OFFICE 2,376,955

MILK PIPE RACK

Norris C. Ball, Denver, Colo.

Application March 13, 1944, Serial No. 526,296

2 Claims. (Cl. 211—60)

This invention relates to improvements in milk pipe racks.

In dairies and wherever milk is handled in large quantities, it is necessary to convey it from one apparatus to another through pipes which are usually made from some noncorrosive metal, such as stainless steel.

Every apparatus that comes in contact with milk must be kept scrupulously clean and this requires a thorough washing as soon as possible after use.

The interiors of pipes are difficult to clean, as they cannot be contacted, except by special tools and are not positioned for visual inspection.

After such pipes have been cleaned by the usual means, including hot water, steam, etc., they must be dried and for this purpose racks comprising a plurality of brackets fastened to a wall or other surface is usually employed. The brackets are positioned so as to incline the pipes slightly so as to permit them to drain. In some cases the pipes are merely set on the floor and leaned against the wall.

In addition to pipes, there are other parts of machines or apparatus, such as valves, couplings, etc., that must be cleaned and dried.

It is the object of this invention to produce a simple and substantial milk pipe rack that shall be so constructed that the pipes will hang substantially vertical and which will therefore permit the most rapid and complete drainage.

Another object is to produce a pipe rack of such construction that it will require a comparatively small floor space and which, in addition, will have a large capacity.

Another object is to produce a pipe rack that, in addition to supporting the pipes in vertical condition, will be so constructed that it can be readily moved from place to place and which will be stable and not easily tipped over.

The above and other objects that may become apparent as the description proceeds are attained by means of a construction and an arrangement of parts that will now be described in detail, and for this purpose reference will be had to the accompanying drawing in which the invention has been illustrated, and in which:

Figure 1 is a side elevation of the rack;

Figure 2 is a section taken on line 2—2, Figure 1;

Figure 3 is a side elevation of the lower spool end member; and

Figure 4 is a fragmentary plan view showing a portion of the spool flange and the resilient pipe retaining means.

In the drawing reference numeral 5 designates the floor on which the rack is supported and 6 the base, which has been shown as formed from a casting having a hub 7 and three legs, but which may be constructed in any other suitable manner. Extending upward from the base is a pipe 8, whose lower end is positioned in the hub. This pipe terminates about ten feet above the floor, and is provided with a collar 9 that is secured in any one of several vertically spaced positions by means of a bolt or pin 10 that extends through any one of a number of vertically spaced openings 11.

Resting on the collar 8 is a spool comprising a pipe 12 of an inside diameter slightly larger than the outside diameter of pipe 8. Floor flanges 13 are threadedly connected with the ends of pipe 12 and secured to the floor flange are circular spool ends 14 whose construction has been shown in greater detail in Figures 2 and 3. In the device as now constructed, ends 14 are eighteen inches in diameter and are provided in their peripheral edges with twelve notches. Six of these notches have been designated by reference character $a$ and six by $b$. All of the notches have a width of two inches, notches $a$ are five inches in depth and notches $b$ two and one-half inches in depth. The width and depth are determined by the size of the milk pipes, which have been indicated by dotted lines and designated by reference numeral 15. In most places, these pipes have an outside diameter of one and one-half inches. The ends 14 are so positioned relative to each other that notches $a$ and $b$ in the upper end are directly above the corresponding notches in the lower end. Notches $a$ are sufficiently deep to accommodate two pipes as indicated in Figure 4, while notches $b$ will accommodate only one pipe. In order to retain the pipes against accidental outward movement, resilient metal strips 16 are secured to the adjacent surfaces of the ends by screws 17. These strips are curved as indicated at 18. Any other suitable retainers may be substituted for those illustrated. The retainers are of such strength that they offer sufficient resistance to prevent the pipes from moving out of the notches in the lower spool end in case the rack is tipped from the vertical and this prevents the center of mass from moving towards the side at which the rack is tipped and this assures greater stability than if the pipes were free to pivot about their point of support on the upper spool end.

The pipes are provided at their ends with couplings 19 that have a diameter greater than two inches and which, therefore, serve to support them in the manner shown in Figure 1. In case the rack should be accidentally tipped to one side, the pipes will be retained in normal relation with respect to the axis. The spring retainers therefore serve a twofold purposes; (1) to prevent the pipes from being accidentally disconnected; and (2) to prevent the shifting of the center of mass if the rack is accidentally moved from its normally vertical position.

The rack can be constructed of any desirable size and of any suitable material. Ends 14 may be made from wood fiber, metal or plastic.

Having described the invention what is claimed as new is:

1. In a milk pipe rack having a base, an elongated cylindrical pivot secured at its lower end to the base and projecting vertically therefrom, means for supporting milk pipes comprising a spool having a hub and end flanges, the hub having an opening, extending its entire length, for the reception of the pivot, cooperating means on the pivot and on the spool for rotatably supporting the spool, the end flanges of the spool having an even number of radially spaced notches extending inwardly from their peripheries, alternate notches being of greater depth than the others, corresponding deep and shallow notches being positioned in the same radial planes, the width of the space between adjacent notch walls being substantially equal, and spring detents having bases positioned against and secured to those portions of the flanges between the notches, the ends of the spring detents being positioned in adjacent notches, the ends projecting into the notches being concave on the side facing the wall surfaces of the notches, the curved ends being flexible.

2. In a milk pipe rack having a base, an elongated cylindrical pivot secured at its lower end to the base and projecting vertically therefrom, means for supporting milk pipes comprising a spool having a hub and end flanges, the hub having an opening, extending its entire length, for the reception of the pivot, cooperating means on the pivot and on the spool for rotatably supporting the spool, the end flanges of the spool having an even number of radially spaced notches extending inwardly from their peripheries, alternate notches being of greater depth than the others, corresponding deep and shallow notches being positioned in the same radial planes, the width of the space between adjacent notch walls being substantially equal, and resilient means adjacent the peripheries of the flanges for resisting outward movement of pipes.

NORRIS C. BALL.